(12) United States Patent
Chueh et al.

(10) Patent No.: US 11,422,679 B2
(45) Date of Patent: Aug. 23, 2022

(54) SYSTEMS AND METHODS FOR NAVIGATING PAGES OF A DIGITAL MAP

(71) Applicant: Ford Global Technologies, LLC, Dearborn, MI (US)

(72) Inventors: Shan Chy Chueh, Ypsilanti, MI (US); Yifan Chen, Ann Arbor, MI (US); Hao Howard Yang, Ann Arbor, MI (US); John Vincent, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/154,381

(22) Filed: Jan. 21, 2021

(65) Prior Publication Data
US 2022/0229522 A1    Jul. 21, 2022

(51) Int. Cl.
| G06F 3/048 | (2013.01) |
| G06F 3/0483 | (2013.01) |
| G06F 3/04845 | (2022.01) |
| G06F 3/04817 | (2022.01) |
| G06F 3/0482 | (2013.01) |

(52) U.S. Cl.
CPC .......... *G06F 3/0483* (2013.01); *G06F 3/0482* (2013.01); *G06F 3/04817* (2013.01); *G06F 3/04845* (2013.01)

(58) Field of Classification Search
CPC .. G06F 3/04817; G06F 3/0482; G06F 3/0483; G06F 3/04845
See application file for complete search history.

(56) References Cited

U.S. PATENT DOCUMENTS

| 9,710,134 | B1* | 7/2017 | Russell | H04M 1/2746 |
| 2008/0307343 | A1* | 12/2008 | Robert | G06F 3/0482 |
| | | | | 715/765 |
| 2011/0163971 | A1* | 7/2011 | Wagner | G06F 3/04883 |
| | | | | 345/173 |
| 2012/0075337 | A1* | 3/2012 | Rasmussen | G06T 11/40 |
| | | | | 345/629 |
| 2014/0028557 | A1* | 1/2014 | Otake | G06F 3/03547 |
| | | | | 345/158 |
| 2014/0201655 | A1* | 7/2014 | Mahaffey | G06F 3/04817 |
| | | | | 715/765 |
| 2017/0270115 | A1 | 9/2017 | Cormack et al. | |
| 2018/0300324 | A1 | 10/2018 | Ziraknejad et al. | |
| 2018/0348998 | A1* | 12/2018 | Mueller | G06K 9/6221 |

FOREIGN PATENT DOCUMENTS

JP    2012155394 A    8/2012

OTHER PUBLICATIONS

Oren Eli Zamir, "Clustering Web Documents: A Phrase-Based Method For Grouping Search Engine Resullts", University of Washington, 1999, 208 pages.

* cited by examiner

*Primary Examiner* — Claudia Dragoescu
(74) *Attorney, Agent, or Firm* — Brandon Hicks; Eversheds Sutherland (US) LLP

(57) ABSTRACT

Systems and methods navigating a digital map are provided herein. A method includes displaying a plurality of clusters. Each cluster includes a plurality of page icons and each page icon linking to a page. The method includes receiving a control input to move a page icon from a first one of the clusters to a second one of the clusters.

18 Claims, 8 Drawing Sheets

SYSTEMS AND METHODS FOR NAVIGATING PAGES OF A DIGITAL MAP

BACKGROUND

Displays and models of a transportation operating system (TOS) allow users to explore features of a digital map. However, interacting with the digital map may be difficult. For example, as the number of features of the digital map increase, traditional navigation menus may no longer be suitable for managing the complexity of the map.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The systems and methods described herein help users navigate features of a map system and make information easier to discover. The display system can help facilitate socio-economic impact evaluation, business viability assessment, and policy formation.

Figure 1:
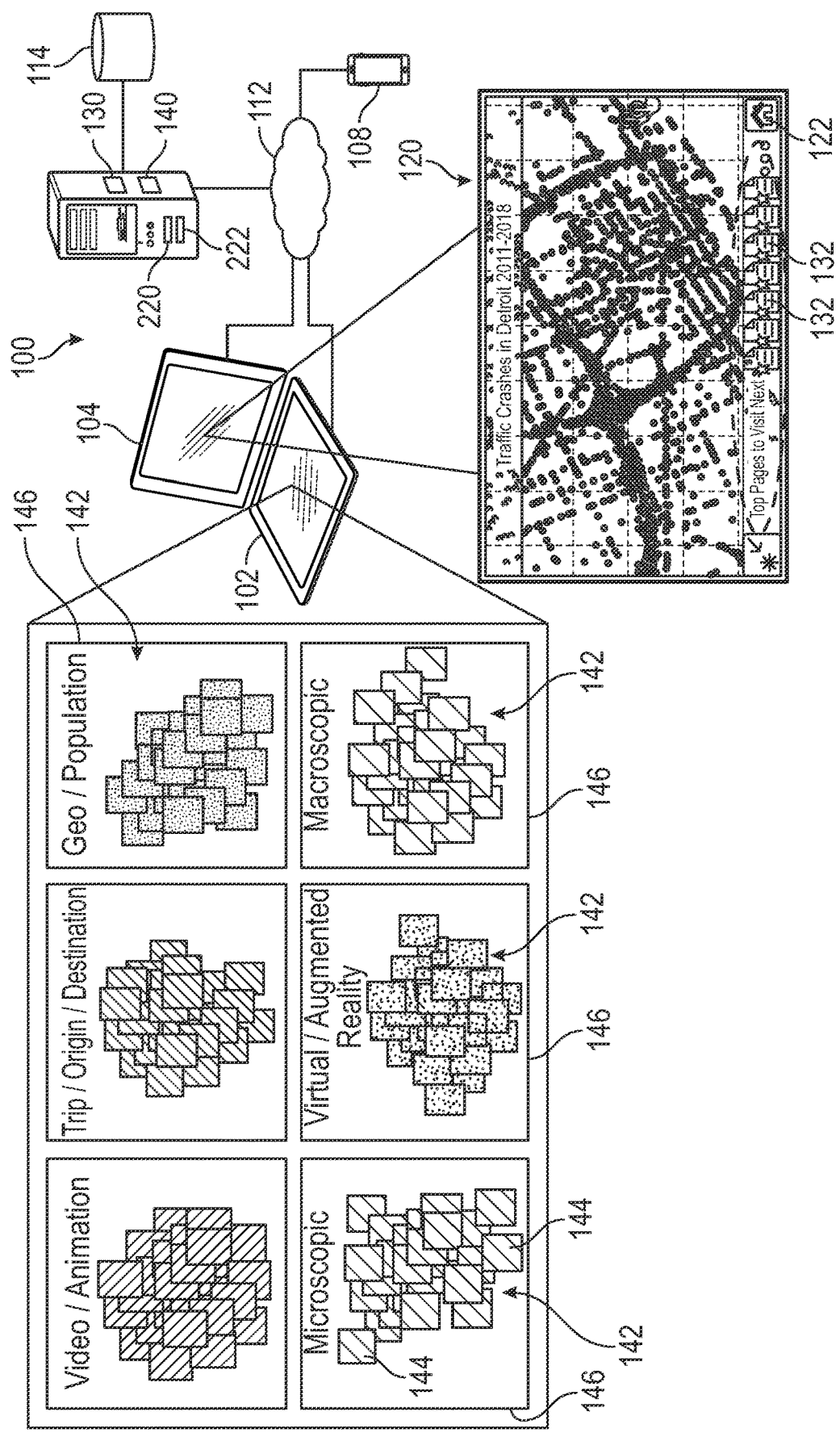
FIG. 1 depicts a display system in accordance with the disclosure.

Referring to FIG. 1, a display system 100 includes a first display 102 (e.g., a horizontal light emitting diode (LED) touch screen display) and one or more devices for interacting with the first display 102 including a mobile device 108 and an auxiliary display 104 (e.g., vertical LED touch screen display). The display system may include one or more computer systems including a system computer 110. The first display 102, auxiliary display 104, mobile device 108, and system computer 110 may communicate with one another over a network 112.

The display system 100 includes a database 114 including data or information from different sources. The display system 100 may display the data as pages 120 (e.g., map pages) to produce meaningful insights. Data sources may include geospatial data, city data, vehicle data, mobility scenario simulation results, and the like.

The display system 100 manages the complexity of the database 114. In particular, the display system 100 organizes the information in the database 114 to make relevant pages 120 easily discoverable and provides recommendations on what pages to visit.

Each page 120 may display one or more sources of data on a map. For example, the page 120 of FIG. 1 includes the locations of traffic accidents for a certain time period on a map of a geographical area.

The display system 100 may use a recommendation model 130 to determine a recommended set of pages 120. The recommendation model 130 may be generated using relationships between a user and one or more pages 120 (e.g., user page data), similarity between user page data of different users, and/or similarity between user page data of different pages.

For each page 120, the display system 100 uses the recommendation model 130 to determine a set of recommended pages 120 that are displayed on the page 120 as a set of recommended page icons 132. Each recommended page 120 is represented by a recommended page icon 132. In FIG. 1, the recommended page icons 132 are displayed along a bottom edge of the page 120. The recommended page icons 132 can be displayed in any suitable arrangement on a page 120.

In response to an input, action, or gesture that provides a selection (e.g., by clicking a mouse with a cursor positioned over a recommended page icon 132 or tapping on a recommended page icon 132 on a touchscreen) of a recommended page icon 132, the display system 100 displays the page 120 linked to the recommended page icon 132. Each recommended page icon 132 links to a page 120.

The display system 100 may include a classification model 140 to determine a set of pages 120 to combine (e.g., as files in a folder) to facilitate navigation among different themes or classifications. As with the recommendation model 130, the classification model 140 may determine the similarity between the page data of different pages 120. For example, if there is a high degree of similarity between the descriptions or metadata of a set of pages 120, the pages 120 are combined as a set that is associated with a theme or characteristic.

Referring to FIG. 1, each set of pages 120 is associated with a theme or characteristic and is displayed as a cluster 142 of page icons 144 (e.g., overlapping) in a window 146 (e.g., a box or frame). One or more clusters 142 of page icons 144 are displayed by the display system 100 for purposes of organizing the pages 120 for navigation by theme or characteristic. The clusters 142 are labeled according to their theme.

Displaying the pages 120 in this manner allows a user to find a page 120 by theme or characteristic. For example, a user may focus on one cluster 142 that has pages 120 related to a theme of interest.

Figure 2:
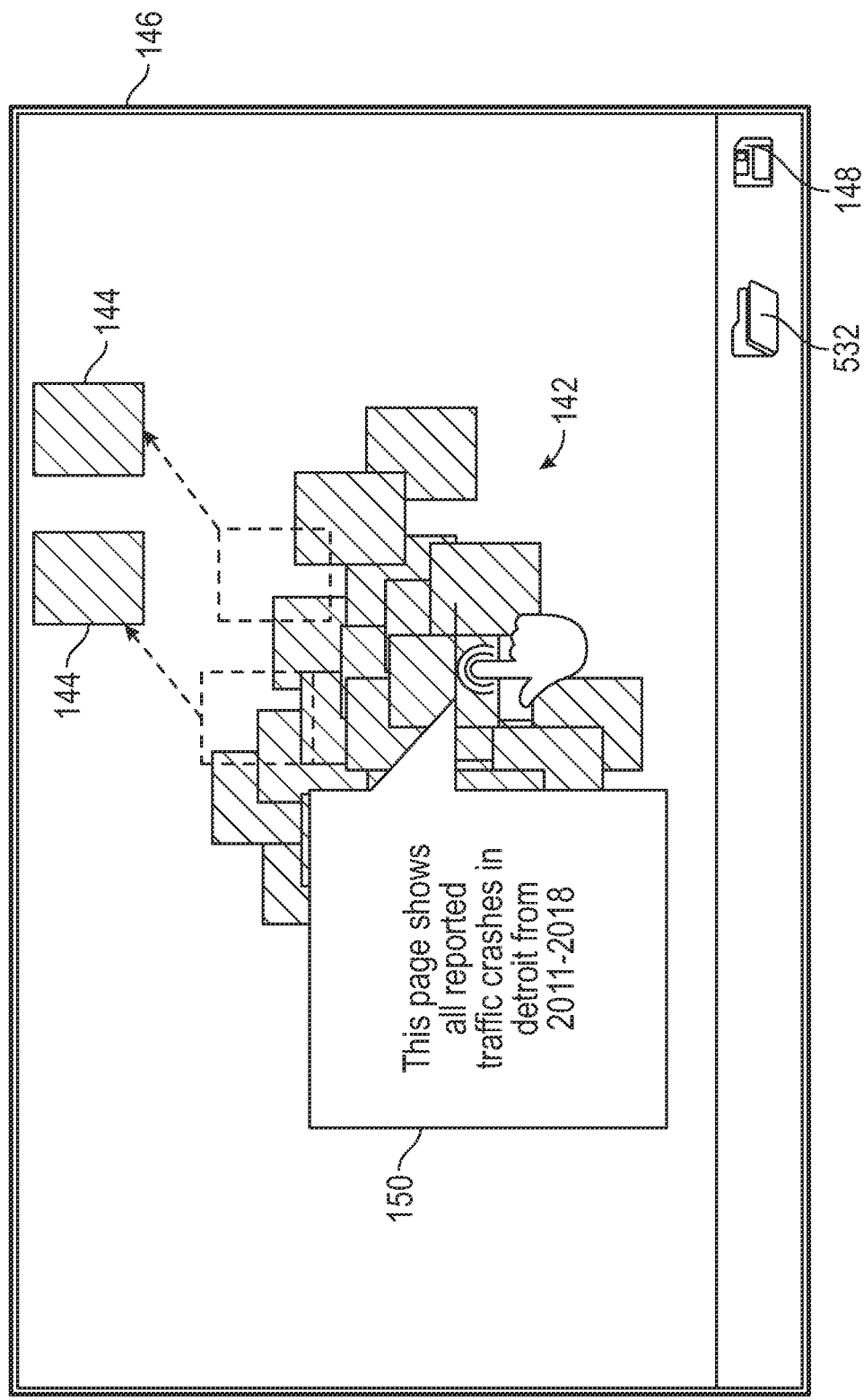
FIG. 2 depicts a method of rearranging a page within a window of a cluster in accordance with the present disclosure.

Displaying the feature pages in this manner also allows the user to rearrange or regroup the pages 120. Referring to FIG. 2, a user can select a page icon 144 and isolate the page icon 144 from the cluster 142 in the window 146.

Figure 3:
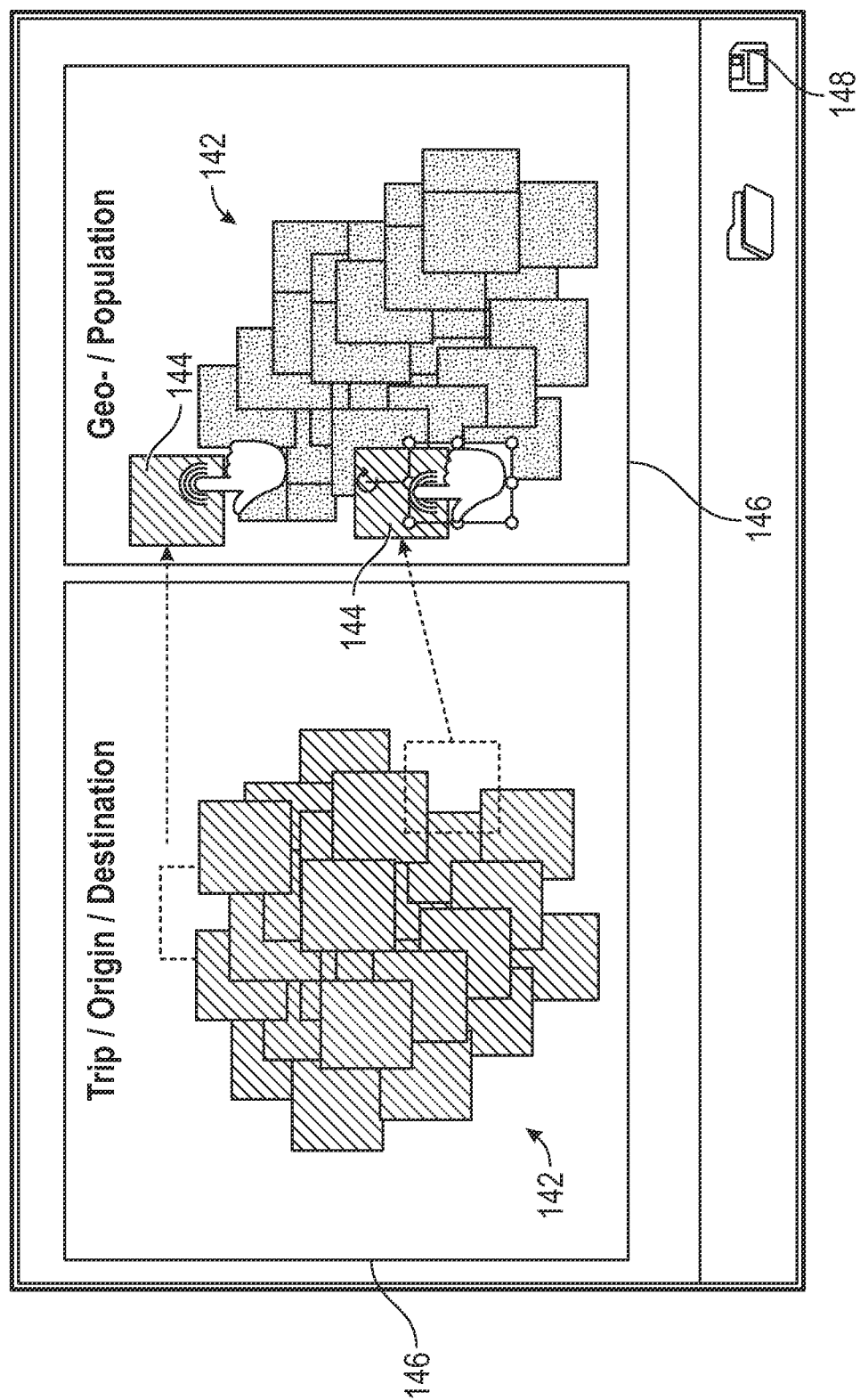
FIG. 3 depicts a method of moving a page from one cluster to another cluster in accordance with the present disclosure.

In addition, each cluster 142 may be configured as a folder and each page icon 144 may be configured as a file that can be moved between folders. Referring to FIG. 3, a user can select a page icon 144 located in one cluster 142, drag the page icon 144 to a location over a second cluster 142, and drop the page icon 144 in the second cluster 142 to rearrange or regroup the pages 120 into different clusters 142 (or to create a new cluster 142). In response, the classification model 140 may be refined, for example, through reinforcement learning.

Alternatively or additionally, a user can explicitly save the moved page 120 to the destination cluster 142 by selecting a save input 148. In this way, the user has the option to use a classification-model-generated cluster 142 diagram or use an adjusted cluster 142 diagram saved from a prior session.

Continuing with FIG. 2, a user may browse the page icons 144 of a cluster 142. The display system 100 may receive a control input (e.g., press and hold on a page icon 144) to inquire about a page 120 and displays a description of that page 120 in a bubble or text box 150.

If the overview description describes a page 120 for which the user is searching, the user may visit the page 120 using a control input or gesture. For example, the user may select the page 120 (e.g., by tapping on the page icon 144 or text box 150). In response to the selection, the display system 100 follows a link to the page 120 associated with the page icon 144 (e.g., as shown in FIG. 1). Referring momentarily to FIG. 1, a home input 122 returns to the cluster 142 diagram from a page 120.

Figure 4:
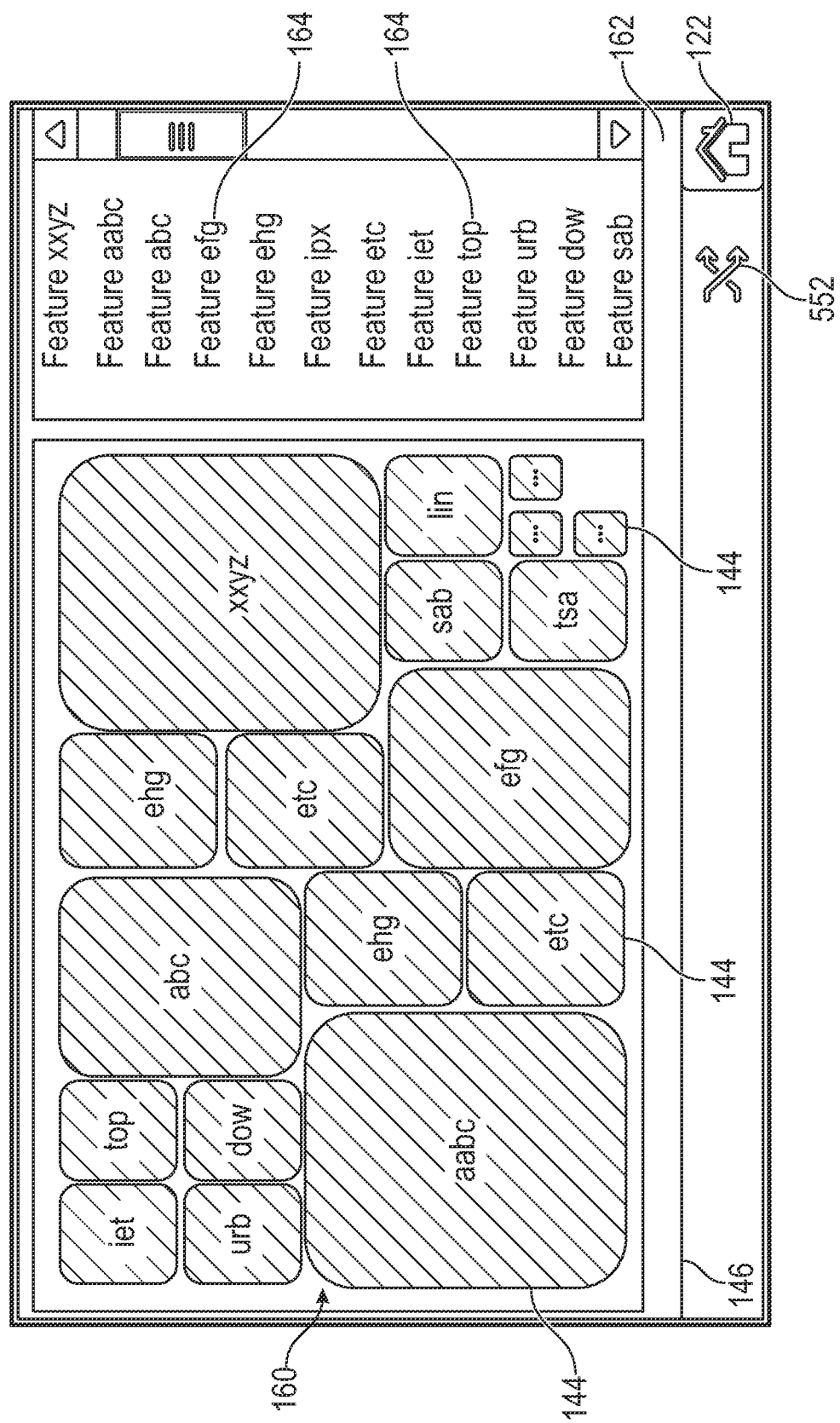
FIG. 4 depicts a collage in accordance with the present disclosure.

In addition, referring to FIGS. 2 and 4, a user may zoom in on a cluster 142 using one or more touchscreen control inputs or gestures (e.g., spreading fingers apart). Zooming enlarges the size or scale of the cluster 142 while the size or scale of the window 146 remains fixed. When cluster 142 is enlarged to the extent that the cluster 142 (e.g., an outermost page icon 144 of the cluster) touches an edge or boundary of the window 146, the display system 100 restructures the layout of the page icons 144 from a cluster 142 (e.g., FIG. 2) to a collage 160 (e.g., FIG. 4).

In the collage 160, the page icons 144 are resized relative to one another to fit the window 146. In an adjacent panel 162, a list of page links 164 are displayed. The page icons 144 are sized and the list of page links 164 are ordered according to a ranking. For example, the ranking may reflect the popularity of a page (e.g., as measured by the number of clicks on the page). Here, the page icon 144 of a more popular page 120 is larger and the page link 164 of the page 120 is closer to the top of the list. Conversely, the page icon 144 of a less popular page 120 is smaller and the page link 164 of the page 120 is closer to the bottom of the list.

Illustrative Embodiments

Referring to FIG. 1, the display system 100 includes the first display 102. The first display 102 may be a light emitting diode (LED) first display for use in a transportation operating system (TOS) model.

The display system 100 may also include one or more devices for interacting with the first display 102 including a touchscreen of the first display 102, the auxiliary display 104, and the mobile device 108. The display system 100 may also include one or more computer systems including the system computer 110.

Functions disclosed herein can be executed internally by the first display 102, the auxiliary display 104, and the mobile device 108, and/or can be executed externally by the system computer 110. Generally, the functions of the display system 100 may be centralized or decentralized among the elements of the display system 100.

The first display 102, auxiliary display 104, the mobile device 108, and the system computer 110 may communicate with one another over the network 112. The network 112 may include any one or a combination of multiple different types of networks, such as cable networks, the Internet, wireless networks, and other private and/or public networks. In some instances, the network 112 may include cellular, Wi-Fi, or Wi-Fi direct.

The system computer 110 includes a memory 220 and a processor 222. The memory 220 stores instructions that are executed by the processor 222 to perform aspects of methods disclosed herein (e.g., method 500). When referring to operations executed by the system computer 110, it will be understood that this may include the execution of instructions by the processor 222.

Each of the first display 102, auxiliary display 104, and the mobile device 108 may similarly include a memory and processor for executing instructions of the methods described herein. For purposes of illustration, the methods may be described as being executed by the system computer 110.

The database 114 may be part of the memory 220 or part of a separate system. The database 114 includes data or information from different sources. The display system 100 may display the data as pages 120 (e.g., map pages). Data that is displayed on pages 120 may include city data, vehicle data, geospatial data, digital objects, object data (object location and information), event data, mobility scenario simulation results, and the like.

The object location may be coordinates on a coordinate system. The object information (e.g., characteristics of the object) may include descriptions, statistics, graphics, and other information associated with the object. A digital object may be a footprint, graphical representation of the object, or digital polygon-shaped cross-sectional area. The digital object may define an area of connected streets, the footprint of a building, or an event object (e.g., traffic accident).

Objects may include roads, parking lots, buildings, districts, neighborhoods, bodies of water, parks, vehicles, pedestrians, public transportation systems, and the like.

Digital objects may further include graphical representations of time-based or event-based information such as traffic accidents, traffic congestion, criminal activity, environmental information (e.g., from a weather station), temporal information (e.g., the time period at which the event exists), and the like. Similarly, digital objects may represent statistical information associated with an area or location such as census data.

Generally, a digital object may be a graphical representation of an individual object or may represent a group of individual objects, information, or statistics. Digital objects may be displayed at actual locations of traffic accidents or a single digital object may be used to represent the number of traffic accidents in an area. For example, more traffic accidents could be represented by a larger digital object or the digital object could be an area and the number of accidents in the area could be represented by the color of the digital object. Here, selection of a single digital object that represents the number of traffic accidents may cause the display system 100 to then display digital objects at the actual locations of the traffic accidents and statistics about the accidents as group. Each individual digital object could then be selected to get more details or information about a specific accident.

In general, object data includes a digital object, an object location, and a next layer of data to display upon selection of the digital object. The next layer of data to display may include one or more additional digital objects, object information, characteristics, descriptions, statistical information, graphical information, combinations thereof, and the like.

The system computer 110 is configured to compile and format the data to generate a page 120 (e.g., an image of a map of a geographical area with objects positioned at an associated object location on the map). The system computer 110 displays the page 120 on the first display 102, on the auxiliary display 104, and/or on the mobile device 108.

A user may interact with the first display 102 through a touchscreen of the first display 102, with the mobile device 108 (e.g., that controls a cursor on the first display 102), through a touchscreen of the auxiliary display 104, and/or in other ways.

An interaction, control input, or control gesture may include a tap gesture to select a location (e.g., a cluster 142 or page icon 144, save input 148) on the touchscreen of the first display 102, a gesture to spread two fingers apart on the touchscreen of the first display 102 to zoom in, a gesture to bring two fingers together on the touch screen of the first display 102 to zoom out, a gesture to touch down and slide a finger across the touchscreen of the first display 102 to select and drag a page icon 144, and a gesture to lift a finger from the touchscreen of the first display 102 after a slide to drop the page icon 144 at a new location (e.g., a new cluster 142). Selecting a location (e.g., a page icon 144 location) that includes a link may provide information in a text box 150 bubble or open a linked page 120. Similarly, control inputs may be provided by a mouse that controls a cursor, the mobile device, and the like.

A user may register an individual profile account that is stored in the database 114 or on the system computer 110. The user may login to the individual profile account with a username and password to initiate a session via the display system 100. During a session, the user may interact with the first display 102 and the display system 100 builds the user's individual profile account. The actions by a user to interact with the display system 100 during a session are added to the individual profile account of the user.

For example, the individual profile account may include or generate user page data. The user page data may be generated from actions of a user with respect to a page.

User page data may include implicit ratings (e.g., clicks, selections, interactions, views, the current feature page (e.g., FIG. 1), and the like), other session history, explicit ratings (e.g., feedback such as "starred" pages), page grouping or regrouping actions (e.g., moving pages between clusters and saving the page to the cluster), combinations thereof, and the like. A click on a page may be weighted by an amount of time that the user remains on the page before exiting or selecting another page.

Other session history may include user page data such as pages viewed during the same session, feature pages viewed in sequence, duration that pages are viewed, other viewing patterns, combinations thereof, and the like.

Page data may include descriptions (e.g., overview) and metatdata (e.g., categories (including reclustering or categorization by users), attributes, keywords (e.g. in the descriptions or metadata), type of event, and the like).

The display system 100 manages the complexity of the database 114. In particular, the display system 100 organizes the information in the database 114 to make relevant pages 120 easily discoverable and provides recommendations on what pages to visit.

Each page 120 may display one or more sources of data on a map. For example, the page 120 of FIG. 1 includes the locations of traffic accidents for a certain time period on a map.

The display system 100 may use the recommendation model 130 to determine a recommended set of pages 120. The recommendation model 130 may be generated using relationships between a user and one or more pages (e.g., user page data), similarity between user page data of different users, and/or similarity between user page data of different pages.

Similarity between the page data of different pages 120 may be measured using a distance metric. For similarity between continuous variables (e.g., numeric data points), a Minkowski distance may be used. For similarity between categorical variables or keywords, a Hamming distance may be used.

The recommendation model 130 may determine the similarity between user page data of different users. For example, if there is a high degree of similarity between the pages 120 visited by two different users, the pages 120 that have been visited by one of the users and not the other of the users may be recommended to the user that has not visited those pages 120. This is implemented through the "collaborate filtering" method, which finds patterns of a group of people share similar preferences, therefore, the recommendation system will be able to predict the preference of a person even though the person does not have usage data of the items.

The recommendation model 130 may determine the similarity between the page data of different pages 120. For example, if there is a high degree of similarity between the descriptions or metadata of two different pages 120 and the user has visited one of the pages 120, the other of the pages 120 may be recommended to the user. This is implemented through the "content filtering" method, which predict a person's preference based on the person's previous preference on the similar items.

The recommendation model 130 may further recommend pages 120 that the user has implicitly ranked highly through interaction with the display system 100. For example, the recommendation model 130 may recommend pages that are most frequently visited by a user.

The recommendation model 130 may further implement context-based collaborative filtering. For example, it recommends/highlights page data based on real time contexts, such as heavy traffic, special events, weather condition, emergency, time of the day, etc.

The recommendation model 130 may also be generated using methods such as supervised learning (e.g., classification models), unsupervised learning (e.g., principal component or cluster analysis), reinforcement learning, case-based reasoning, pattern matching, combinations thereof, and the like.

The display system 100 uses the recommendation model 130 to determine a set of recommended pages 120 that are displayed on the currently viewed page 120 as a set of recommended page icons 132. Each recommended page 120 is represented by a recommended page icon 132. In FIG. 1, the recommended page icons 132 are displayed along a bottom edge of the page 120. The recommended page icons 132 can be displayed in any suitable arrangement on a page 120.

In response to control input that provides a selection (e.g., by clicking a mouse with a cursor positioned over a recommended page icon 132 or tapping on a recommended page icon 132 on a touchscreen) of a recommended page icon 132, the display system 100 displays the page 120 linked to the recommended page icon 132. Each recommended page icon 132 links to a page 120.

The display system 100 may include the classification model 140 to determine a set of pages 120 to combine (e.g., as files in a folder) to facilitate navigation among different themes or classifications. As with the recommendation model 130, the classification model 140 may determine the similarity between the page data of different pages 120. For example, if there is a high degree of similarity between the descriptions or metadata a set of pages 120, the similar pages 120 are combined as a set that is associated with a theme or characteristic.

The classification model 140 may be based on or generated using methods such as text-based classification methods. For example, for similarity between categorical variables or keywords, a Hamming distance may be used.

Referring to FIG. 1, each set of pages 120 is associated with a theme or characteristic and is displayed as a cluster 142 of page icons 144 in a window 146 (e.g., a box or frame). One or more clusters 142 of page icons 144 are displayed by the display system 100 for purposes of organizing the pages for navigation by theme of characteristic. The clusters 142 are labeled according to their theme.

Displaying the pages 120 in this manner allows a user to find a page 120 by theme or characteristic. For example, a user may focus on one cluster 142 that has pages 120 related to a theme of interest.

Displaying the feature pages in this manner also allows the user to rearrange or regroup the pages 120. Referring to FIG. 2, a user can select a page icon 144 and isolate the page icon 144 from the cluster 142 in the window 146.

In addition, each cluster 142 may be configured as a folder and each page icon 144 may be configured as a file that can be moved between folders. Referring to FIG. 3, a user can select a page icon 144 located in one cluster 142, drag the page icon 144 to a location over a second cluster 142, and drop the page icon 144 in the second cluster 142 to regroup the pages 120 into different clusters 142.

A user can explicitly save the moved page 120 to the destination cluster 142 by selecting a save input 148. In this way, the user has the option to use a classification-model-generated cluster 142 diagram or use an adjusted cluster 142 diagram saved from a prior session.

In response, the classification model 140 may be refined, for example, through reinforcement learning. The display system 100 may use data from a user session to change the classification model 140. For example, the number of times a page 120 is reclustered and destination cluster 142 of a page 120 are factored into the degree of similarity between pages 120.

As another example, the display system 100 may update the metadata of the moved page 120 to include the theme or label of the destination cluster 142 (and optionally remove the label of the default cluster 142). The classification model 140 may determine that there is a high degree of similarity between the metadata of the moved page 120 and the set of pages 120 in the destination cluster 142 and keep the moved page 120 in the destination cluster 142 when creating clusters 142 for future sessions.

Continuing with FIG. 2, a user may browse the page icons 144 of a cluster 142. The display system may receive a control input (e.g., press and hold on a page icon 144) to inquire about a page 120 and displays a description of that page 120 in a bubble or text box 150.

If the overview description describes a page 120 for which the user is searching, the user may visit the page 120 using a control input. For example, the user may select the page 120 (e.g., by tapping on the page icon 144 or text box 150). In response to the selection, the display system 100 follows a link to the page 120 associated with the page icon 144 (e.g., as shown in FIG. 1).

Figure 6:
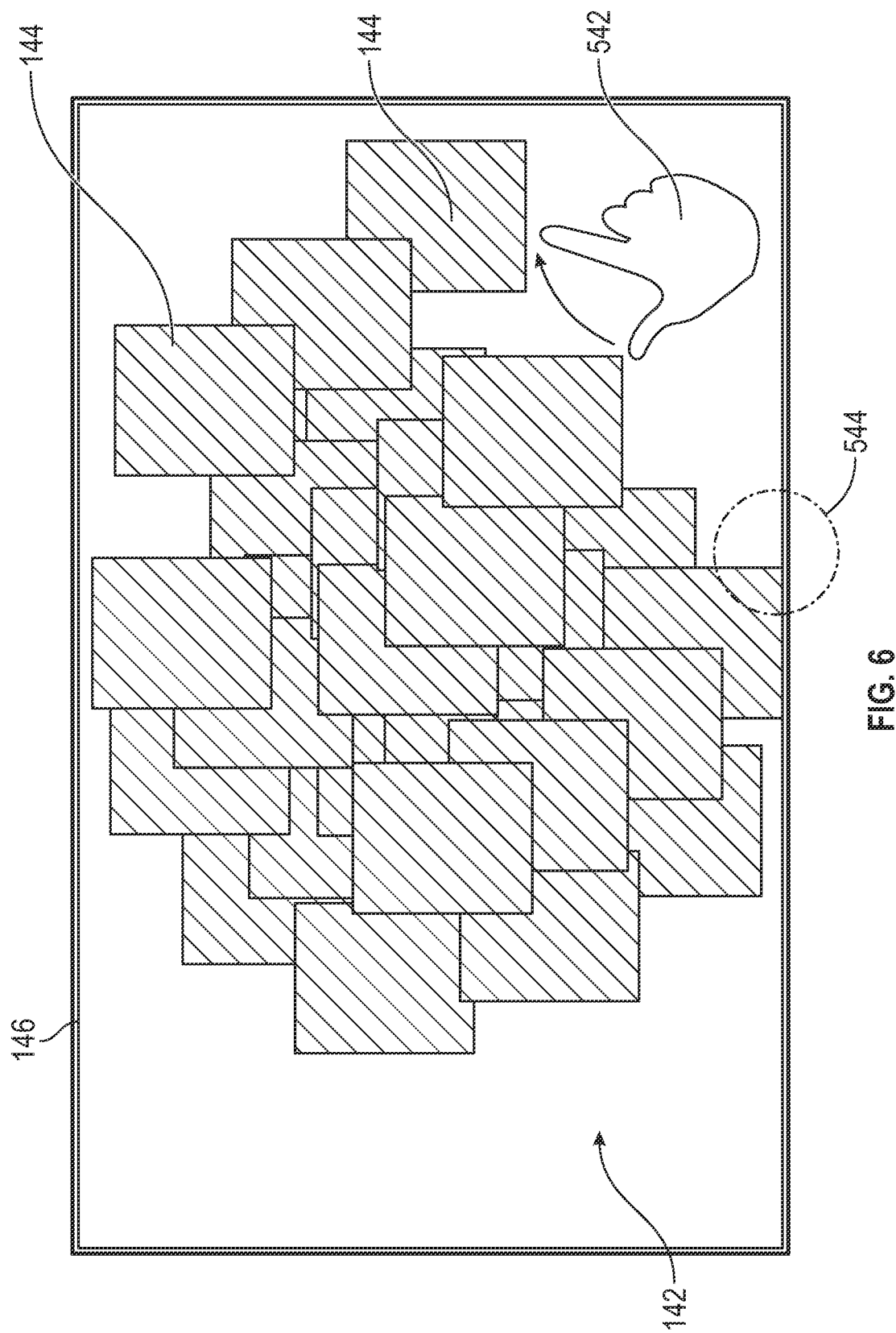
FIG. 6 depicts a method of expanding a cluster in accordance with the present disclosure.

In addition, referring to FIGS. 4 and 6, a user may zoom in on a cluster 142 using one or more touchscreen control inputs (e.g., spreading fingers apart). Zooming enlarges the size or scale of the cluster 142 while the size or scale of the window 146 remains fixed. When cluster 142 is enlarged to the extent that the cluster 142 (e.g., an outermost page icon 144 of the cluster) touches an edge or boundary of the window 146 (e.g., as shown in FIG. 6), the display system 100 restructures the layout from a cluster 142 to a collage 160 (e.g., as shown in FIG. 4).

Continuing with FIG. 4, in the collage 160, the page icons 144 are resized relative to one another to fit into the window 146. In an adjacent panel 162, a list of page links 164 are displayed. The page icons 144 are sized and the list of page links 164 are ordered according to a ranking. For example, the ranking may reflect the popularity of a page (e.g., as measured by the number of clicks on the page). Here, the page icon 144 of a more popular page 120 is larger and the page link 164 of the page 120 is closer to the top of the list. Conversely, the page icon 144 of a less popular page 120 is smaller and the page link 164 of the page 120 is closer to the bottom of the list.

Additionally or alternatively, the ranking can be determined by the recommendation model 130.

Figure 5:
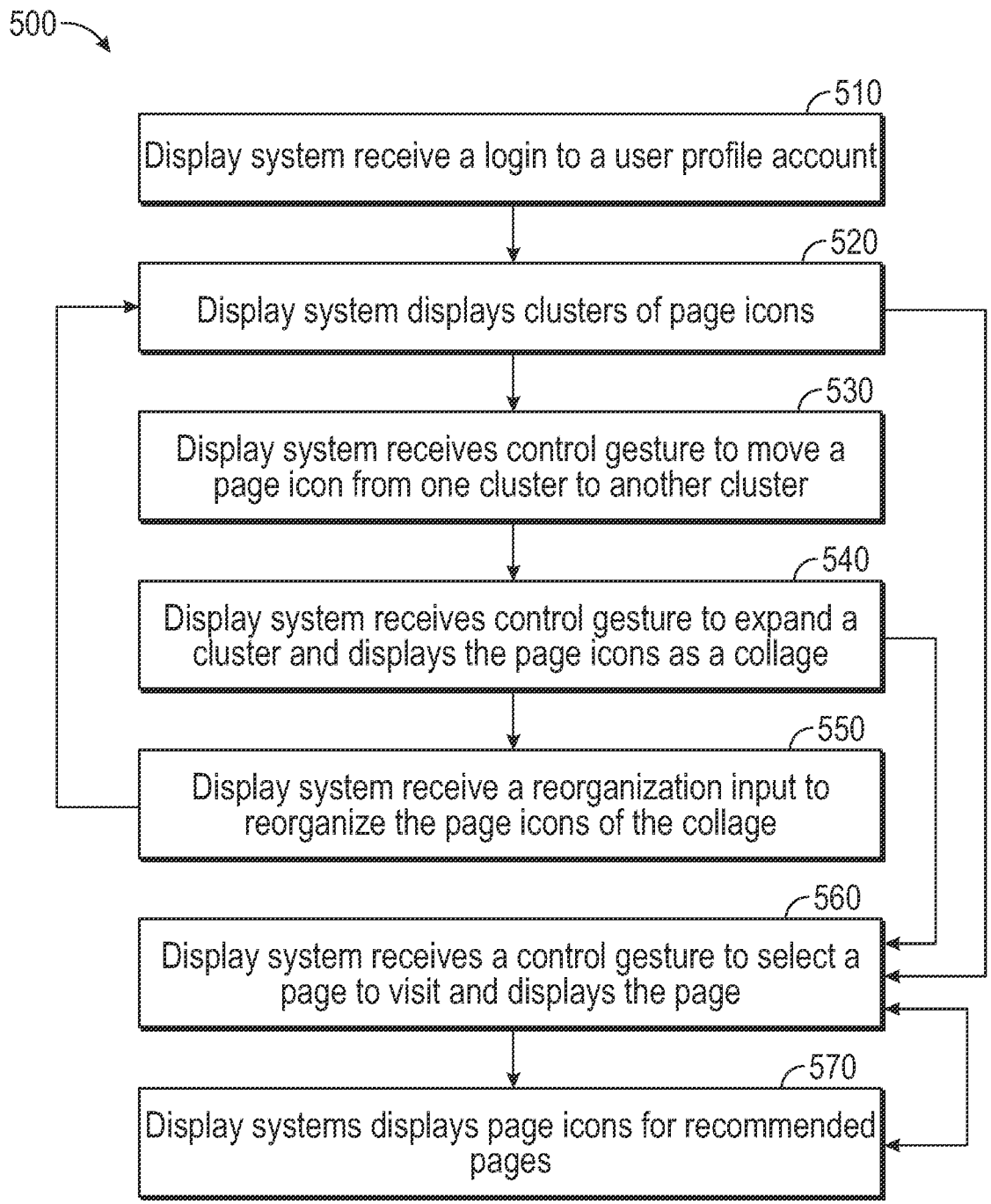
FIG. 5 depicts a method of navigating pages of a digital map in accordance with the present disclosure.

Referring to FIG. 5, according to a first step 510 of an exemplary method 500, the display system 100 receives a login to a user profile account or a guest account. For users that register and login to a user profile account, the system provides more personalized browsing experience based on the user profile and browsing history associated with the account.

According to a second step 520, the display system 100 displays default clusters 142 grouped by themes, for example, as shown in FIG. 1. The display system 100 displays page icons 144 that are frequently visited by the user at the front and center of the cluster 142.

According to a third step 530, the display system 100 receives control input (click, tap, select, drag and zoom) to rearrange the pages 120. For example, the page icons 144 are dragged to different locations within a window 146 (e.g., FIG. 2) of a cluster 142 or dragged to a window 146 of a different cluster 142 such as one of the other default clusters 142 (e.g., FIG. 3).

Here, the display system 100 may also receive a selection of a folder input 532 and creates a new (e.g., empty) cluster 142 in response. Page icons 144 may then be added to the new cluster 142 from the default clusters 142 as described above. The folder input 532 may also be a step before rearranging page icons 144.

After rearranging the pages 120, the display system 100 may receive a selection of the save input 148 and saves changes to the default clusters 142 in response. The display system 100 uses the (e.g., saved) changes to refine the classification model 140 or default clustering algorithm.

According to a fourth step 540, Referring to FIG. 6, the display system 100 receives control input 542 (e.g., press, hold, and drag at a location not on a page icon 144 or cluster 142, and press, hold, and spread apart two fingers at a location not on a page icon 144 or cluster 142) to move (e.g., center) and zoom in on (e.g., expand) a cluster 142 or theme of interest. In some cases, a control input may cause the display system 100 to automatically center and zoom in on a cluster 142 or window 146.

If the display system 100 receives zoom-in control input and expands a cluster 142 in a window 146 until the cluster 142 (e.g., outermost document icon) contacts (e.g., contact 544) the window 146 (e.g., screen boundary), the display system 100 displays the cluster 142 in as a collage 160 (e.g., see FIG. 4). In a collage 160 format, the relative size of the page icons 144 reflect the level of popularity of the page 120 and, in an adjacent panel 162, a corresponding list of page links 164 is displayed and ordered by the level of popularity.

In either the cluster 142 format (e.g., FIG. 2) or the collage 160 format (e.g., FIG. 4), the display system 100 may receive a control input (e.g., press and hold on a page icon 144) to inquire about a page 120 and displays a description of that page 120 in a bubble or text box 150 (e.g., shown in FIG. 2).

Figure 7:
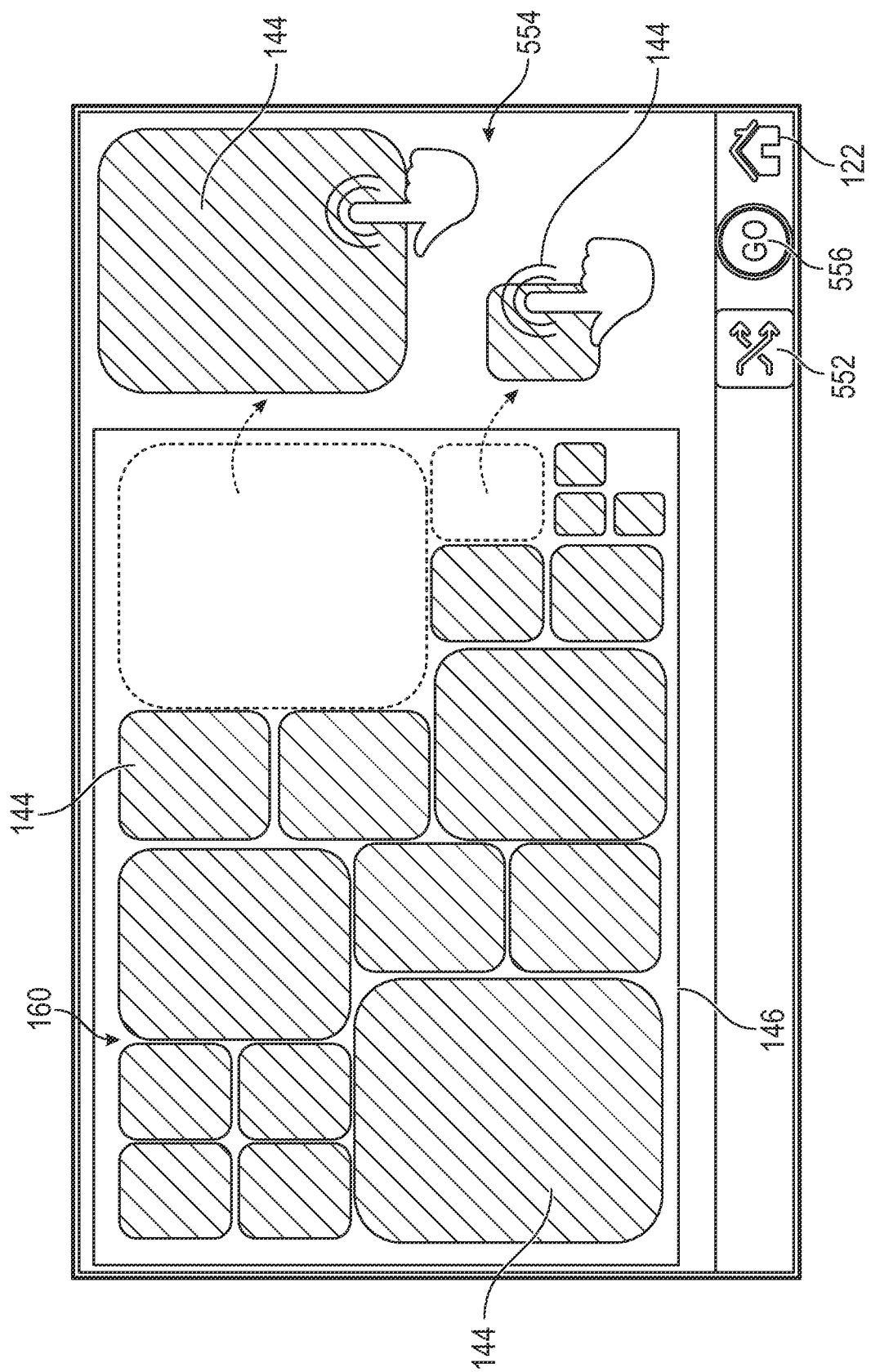
FIGS. 7 and 8 depict a method of moving pages from a collage in accordance with the present disclosure.

Referring to FIG. 7, according to a fifth step 550, the display system 100 receives selection of a reorganization input 552 or other control input (click, tap, select, drag and zoom) to reorganize or rearrange the page icons 144 of the collage 160. After selection of the reorganization input 552, the display system 100 may receive selection of page icons 144 for reorganization.

For example, as shown in FIG. 7, the display system 100 may display a reorganization panel 554 or area outside the window 146 where the page icons 144 may be selected by dragging the page icons 144 from the collage 166 out of the window 146.

Figure 8:
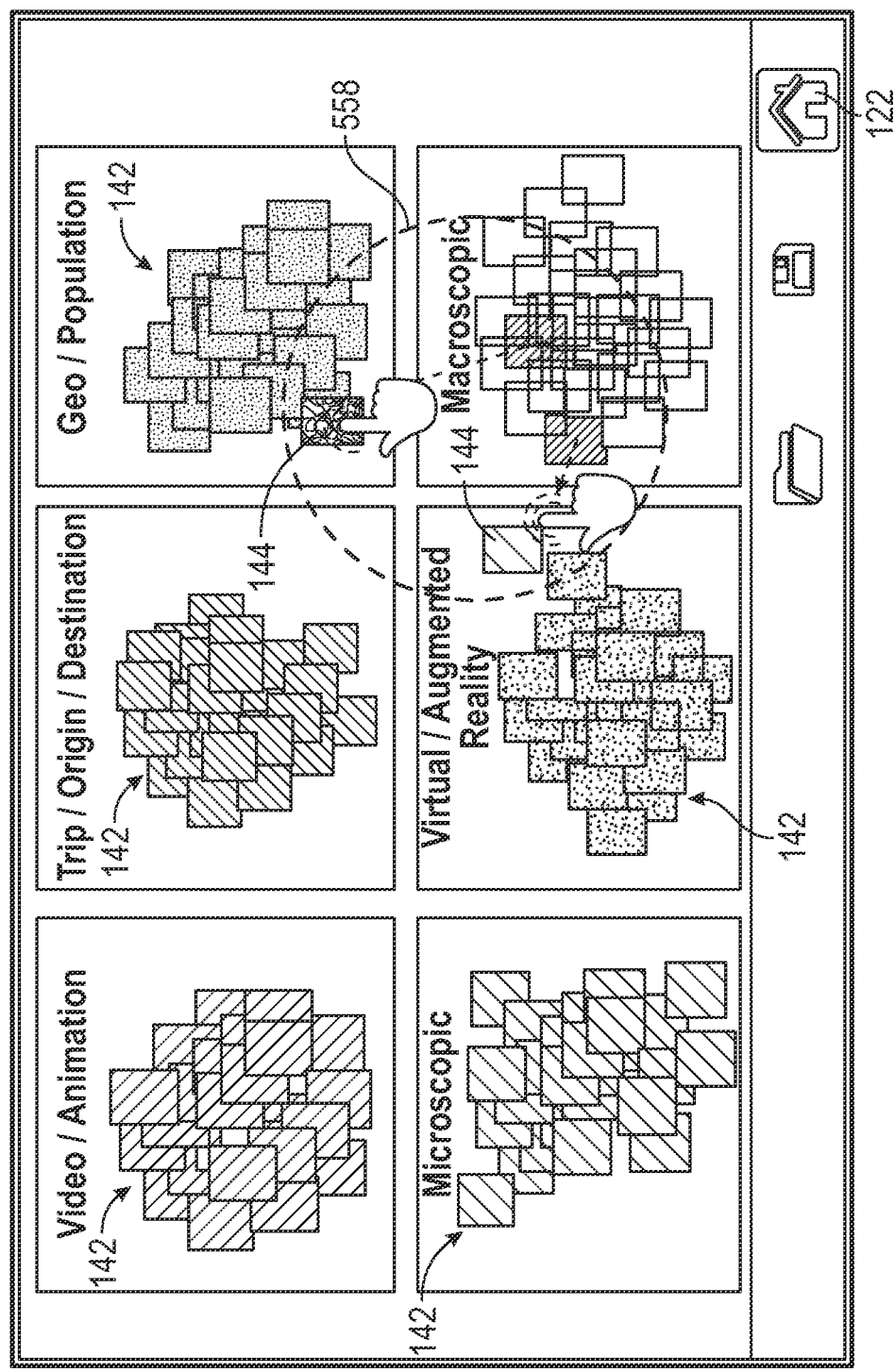

Once the page icons 144 to be reorganized are selected, the display system may receive a confirmation input 556 and the method 500 may return to step 520 where the display system 100 display clusters 142. As shown in FIG. 8, the page icons 144 selected from the collage 160 of the fifth step 550 are highlighted (e.g., see page icons 144 in indicator 558) with respect to the other page icons 144 when displayed as a cluster 142 to identify the selected page icons 144 for reorganization. As in step 530, the selected page icons 144 may be dragged to a window 146 of a different cluster 142.

According to a sixth step 560, in response to receiving a control input (e.g., tap on a page icon 144) to select a page 120 to visit, the display system 100 follows a link to display the selected page 120 (e.g., as shown in FIG. 1). A page icon 144 can be selected from the cluster 142 format (e.g. step 520 and FIG. 2) or from the collage 160 format (e.g., step 540 and FIG. 4).

According to a seventh step 570, the display system 100 also displays page icons 132 for recommended pages 120 from the recommendation model 130. As described above, in response to receiving a control input (e.g., press and hold on a page icon 144) to inquire about a recommended page 120, the system displays a description of the recommended page 120 in a bubble or text box 150. In response to receiving a control input (e.g., swiping page icon 144 to the left or right), the system displays a description of the next recommended page 120 in a bubble or text box 150.

From the seventh step 570, the method 500 may return to the sixth step 560 where, in response to receiving a control input (e.g., tap on a recommended page icon 144) to select a page 120 to visit, the system follows a link to display the selected page 120.

When displaying a page 120 or a collage 160, the display system 100 may include a home input 122 to return to the cluster 142 format (e.g., FIG. 1).

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that stores computer-executable instructions is computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more Application Specific Integrated Circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

The invention claimed is:

1. A method, comprising:
    displaying, by a processor, a plurality of clusters, each cluster including a plurality of page icons, each page icon linking to a page;
    receiving, by the processor, a control input to move a page icon from a first cluster of the plurality of clusters to a second cluster of the plurality of clusters, wherein pages are grouped according to a classification algorithm, wherein the classification algorithm is adjusted based on moving the page icon from the first cluster of the plurality of clusters to the second cluster of the plurality of clusters;
    receiving a control input to expand a first cluster into a collage presentation in a first panel within a window; and
    displaying a list of page links associated with the page icons included within the collage in a second panel adjacent to the first panel.

2. The method of claim 1, wherein moving a page icon from a first one of the plurality of clusters to a second one of the plurality of clusters includes moving the page icon from the window of the first one of the plurality of clusters to the window of the second one of the plurality of clusters.

3. The method of claim 1, comprising displaying, if the one of the plurality of clusters contacts a boundary or edge of the window of the one of the plurality of clusters, the page icons of the first cluster as a collage in the window of the one of the plurality of clusters.

4. The method of claim 3, wherein displaying the page icons as a collage includes determining sizes of the page icons according to a ranking, wherein the ranking is based on a number of clicks on the pages associated with the page icons.

5. The method of claim 1, wherein an order of the list of page links is determined according to a ranking.

6. The method of claim 3, comprising receiving a reorganization input.

7. The method of claim 3, comprising receiving selection of page icons from the collage.

8. The method of claim 7, wherein the selection of page icons includes page icons moved from the collage outside of the window.

9. The method of claim 7, comprising displaying the selected page icons from the collage along with the other of the plurality of clusters, wherein the selected page icons are displayed as highlighted icons.

10. The method of claim 1, comprising displaying an overview description for a page in response to receiving a control input on an associated page icon.

11. The method of claim 1, comprising displaying a page in response to receiving a control input on an associated page icon.

12. The method of claim 11, comprising displaying a plurality of page icons on the page, the plurality of page icons corresponding to recommended pages.

13. The method of claim 1, wherein page icons that are more frequently visited are closer to the center of the first cluster.

14. The method of claim 1, wherein pages are grouped according to a recommendation algorithm.

15. A display system, comprising:
- a display;
- a processor; and
- a memory comprising computer-executable instructions that, when executed by the processor, cause the processor to:
  - display a plurality of clusters, each cluster including a plurality of page icons, each page icon linking to a page;
  - receive a control input to move a page icon from a first one of the plurality of clusters to a second one of the plurality of clusters, wherein pages are grouped according to a classification algorithm, wherein the classification algorithm is adjusted based on moving the page icon from the first one of the plurality of clusters to the second one of the plurality of clusters;
  - receive a control input to expand a first cluster into a collage presentation in a first panel within a window; and
  - receive a control input to move the page icon from the collage in the first panel to a second panel, wherein the second panel is a re-organization panel.

16. The display system of claim 15, wherein the display is a first touch screen display, and wherein the display system includes a second display, wherein the plurality of clusters are displayed on the first touch screen display, and wherein, upon selection of a page icon included within the plurality of clusters, a page associated with the page icon is displayed on the second display.

17. The method of claim 1, wherein the first cluster is associated with a first label based on a first theme, wherein the second cluster is associated with a second label based on a second theme, and wherein adjusting the classification algorithm involves automatically adjusting the first label and the first theme or the second label and the second theme.

18. The display system of claim 15, wherein the computer-executable instructions further cause the processor to:
  - receive a control input to move a second page icon from the collage in the first panel to the second panel, wherein the page icon is a first size, the second page icon is a second size, and wherein the page icon and the second page icon remain as the first size and the second size within the second panel.

* * * * *